United States Patent [19]
Park

[11] Patent Number: 5,608,532
[45] Date of Patent: Mar. 4, 1997

[54] SIGNAL PROCESSING DEVICE AND METHOD FOR A SLOW MODE FUNCTION OF A VTR

[75] Inventor: Hyun-jeong Park, Suwon-city, Rep. of Korea

[73] Assignee: Samsung Electronics Co., Ltd., Kyungki-Do, Rep. of Korea

[21] Appl. No.: 592,547

[22] Filed: Jan. 26, 1996

[30] Foreign Application Priority Data

Jan. 28, 1995 [KR] Rep. of Korea .................. 95-1780

[51] Int. Cl.$^6$ .................. H04N 9/79; H04N 5/78
[52] U.S. Cl. .................. 386/7; 386/34; 386/44; 386/67
[58] Field of Search .................. 358/312, 330, 358/310; 360/9.1, 10.1, 10.3, 27; 348/642, 663, 22

[56] References Cited

U.S. PATENT DOCUMENTS

| | | | |
|---|---|---|---|
| 4,163,993 | 8/1979 | Ravizza | 358/312 |
| 4,400,717 | 8/1983 | Southworth et al. | 348/22 |
| 4,435,725 | 3/1984 | Nagao et al. | 348/663 |
| 4,729,011 | 3/1988 | McCann | 348/183 |
| 4,870,510 | 9/1989 | Edakubo et al. | 360/27 |
| 4,873,587 | 10/1989 | Yoshimura et al. | 360/9.1 |
| 5,084,766 | 1/1992 | Nakatani | 358/335 |
| 5,142,376 | 8/1992 | Ogura | 358/310 |
| 5,327,249 | 7/1994 | Lee | 358/338 |
| 5,337,192 | 8/1994 | Fukasawa et al. | 360/10.3 |
| 5,355,256 | 10/1994 | Fukatsu et al. | 360/10.3 |
| 5,504,534 | 4/1996 | Sakaegi | 348/513 |
| 5,541,737 | 7/1996 | Oguro et al. | 358/335 |
| 5,546,133 | 8/1996 | Honma | 348/642 |

Primary Examiner—Thai Q. Tran
Assistant Examiner—Y. Lee
Attorney, Agent, or Firm—Sughrue, Mion, Zinn, Macpeak & Seas

[57] ABSTRACT

A signal processing device and method which performs stable video signal reproduction in a slow mode function of a video tape recorder by digitally storing only those slow mode images which are stable. The signal processing device includes a signal separator for receiving a composite video signal which is scanned from a video tape in a slow mode of the VTR and separating the received signals into a luminance signal and chrominance signals; an analog-to-digital converter for converting the separated analog luminance and chrominance signals to digital signals; a storage unit for storing the digital luminance and chrominance signals of each field; a digital-to-analog converter for converting the stored signals to analog signals; a microcomputer for generating slow mode signals when a direct current component of an envelope of the scanned composite video signal exceeds a predetermined value; a digital-to-analog converter for converting the stored digital signals to analog signals and outputting the converted signals; a sync signal generator for receiving sub-carrier signals and outputting the composite sync signals and the sub-carrier signals which are frequency-divided; an encoder for encoding the analog-converted signals in response to the composite sync signals and outputting the encoded composite video signals as signals for constituting the slow mode image; and a controller for controlling the storage unit and encoder in response to the slow mode signals and composite sync signals.

7 Claims, 3 Drawing Sheets

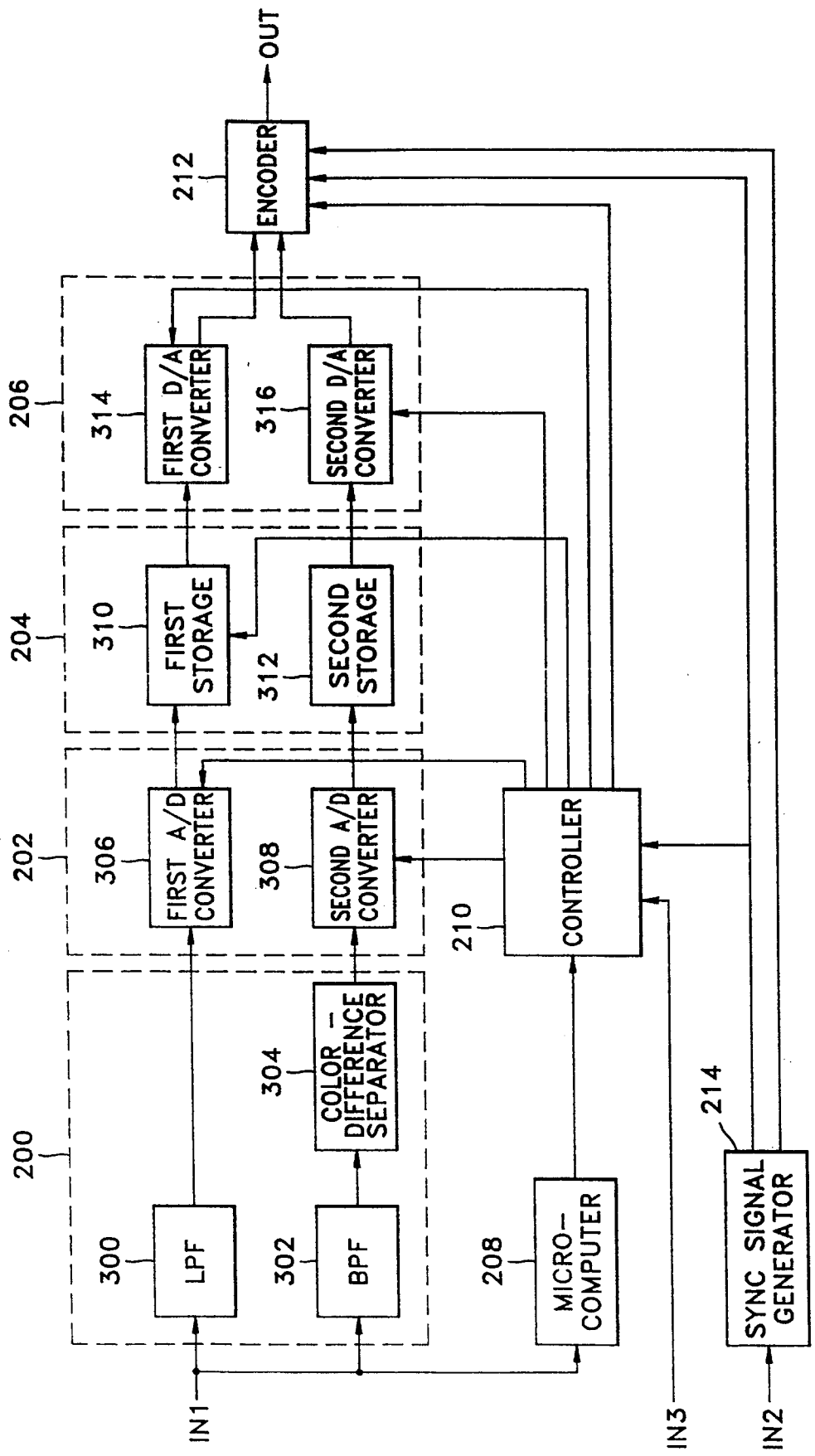

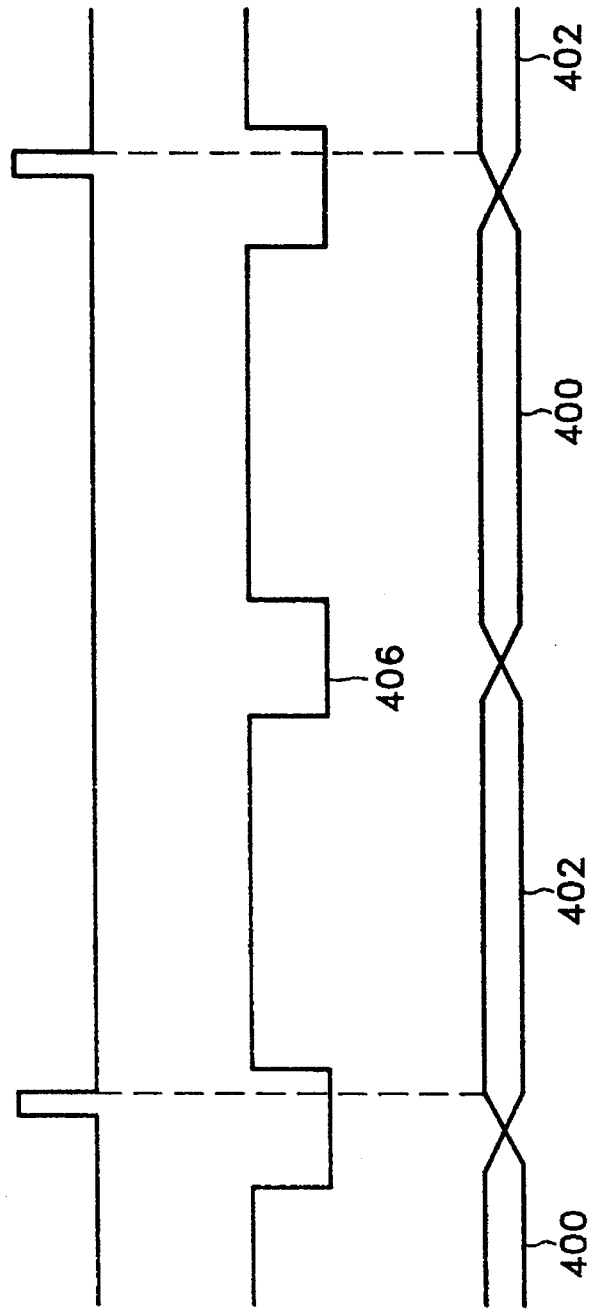

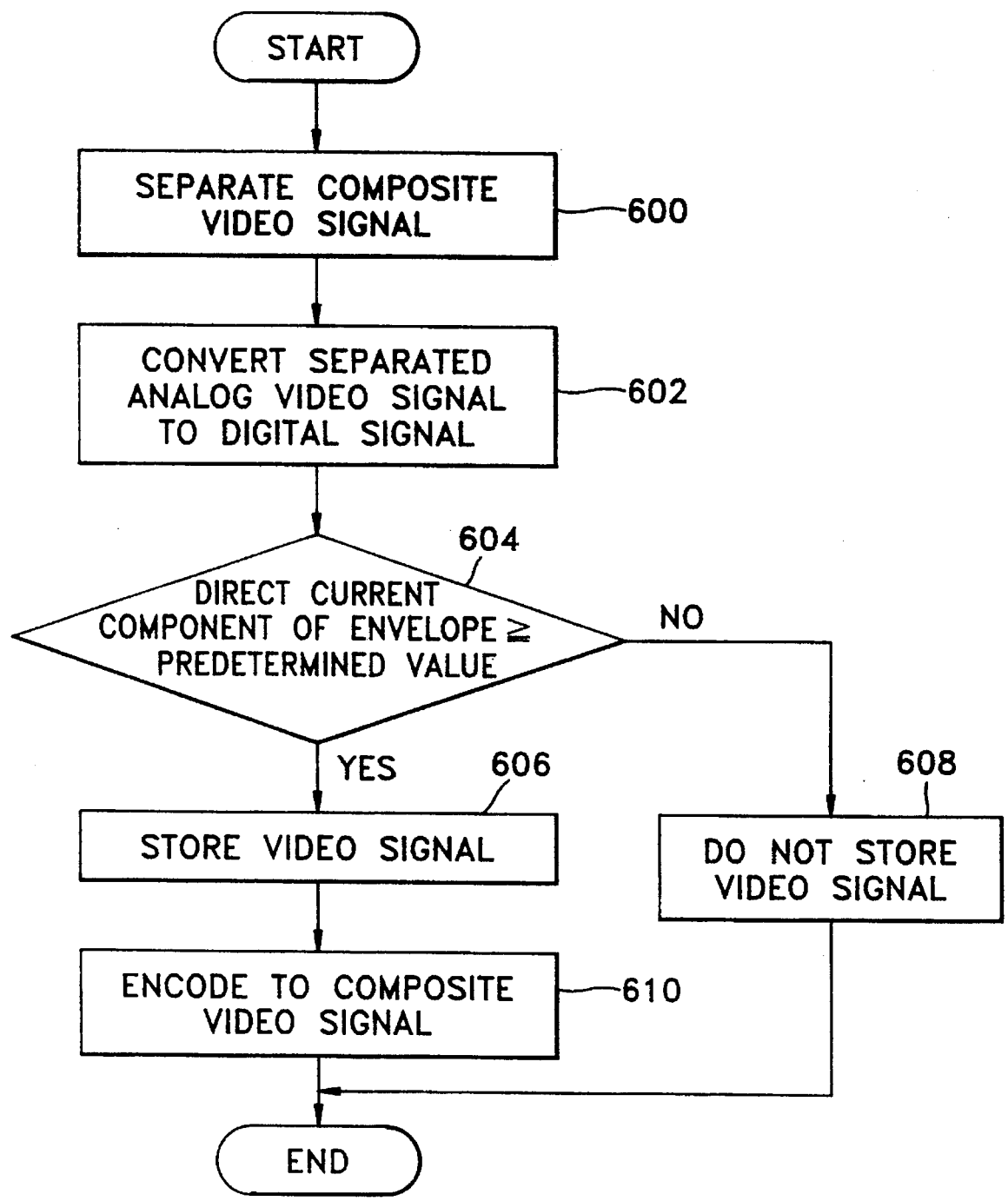

SIGNAL PROCESSING DEVICE AND METHOD FOR A SLOW MODE FUNCTION OF A VTR

BACKGROUND OF THE INVENTION

The present invention relates to signal processing of video tape recorders (VTRs), and more particularly, to a signal processing device and method for a slow mode function of a VTR.

When the slow mode function is performed on a VTR, a head repeats the action of scanning each field recorded on a tape and then stopping the scan so that a slow mode image consisting of the sequentially scanned fields is displayed. However, scattering of the image occurs during slow mode image due to the physical effects on the head of repeatedly scanning and stopping (i.e., repeatedly accelerating and decelerating the head).

SUMMARY OF THE INVENTION

To solve the above problems, it is an object of the present invention to provide a signal processing device for the slow mode function of a VTR, which stores those still images which have a high envelope and which provides the still image for the slow mode function.

It is another object of the present invention to provide a signal processing method for the slow mode function performed in the signal processing device of the present invention.

Accordingly, to achieve the first object, there is provided a signal processing device for a slow mode function of a video tape recorder comprising: a signal separating means for receiving a composite video signal scanned from a video tape in a slow mode of the VTR, and separating the received signal into a luminance signal and a chrominance signal; an analog-to-digital converting means for converting the separated analog luminance and chrominance signals to digital signals; a storing means for storing the digital luminance and chrominance signals of each field; a digital-to-analog converting means for converting the stored signals to analog signals; a microcomputer for generating a slow mode signal when the direct current component of an envelope of the scanned composite video signal exceeds a predetermined value; a digital/analog converting means for converting the stored digital signals to analog signals and outputting the converted signals; a sync signal generator for receiving a sub-carrier signal and outputting a composite sync signal and a sub-carrier signal which is frequency-divided; an encoding means for encoding the analog-converted signals in response to the composite sync signal, and outputting the encoded composite video signal as a signal constituting a slow mode image; and a controlling means for controlling the storing means in response to the slow mode signal and composite sync signal and controlling the encoding means.

To achieve the second object, there is provided a signal processing method for a slow mode function of a video tape recorder, comprising the steps of: separating a composite video signal scanned from a video tape in a slow mode of the video tape recorder into a luminance signal and a chrominance signal; converting the separated analog luminance and chrominance signals to digital signals; judging whether the direct current component of an envelope of the composite video signal exceeds a predetermined value; storing the digital luminance and chrominance signals of each field, if the direct current component of the envelope of the composite video signal exceeds the predetermined value; not storing the digital luminance and chrominance signals if the direct current component of the envelope of the composite video signal is less than the predetermined value; and synthesizing the video signal by encoding the stored signals.

BRIEF DESCRIPTION OF THE DRAWINGS

The above objects and advantages of the present invention will become more apparent by describing in detail a preferred embodiment thereof with reference to the attached drawings in which:

FIG. 1 is a block diagram of a signal processing device for the slow mode function of a VTR according to the present invention;

FIGS. 2A–2C are timing diagrams of a slow mode signal, a dummy vertical sync signal, and the status of a storage unit, respectively; and FIG. 3 is a flowchart for explaining a signal processing method performed in the signal processing device shown in FIG. 1.

DETAILED DESCRIPTION OF THE INVENTION

Referring to FIG. 1, a signal processing device for the slow mode function of a VTR according to the present invention comprises: a signal separator 200 which includes a low pass filter (LPF) 300, a band pass filter (BPF) 302 and a color-difference separator 304; an analog-to-digital (A/D) converter 202 which includes a first A/D converter 306 and a second A/D converter 308; a storage unit 204 which includes a first storage unit 310 and a second storage unit 312; a digital-to-analog (D/A) converter 206 which includes a first D/A converter 314 and a second D/A converter 316; a microcomputer 208; a controller 210; an encoder 212; and sync signal generator 214.

Referring to the flow chart of FIG. 3 and the block diagram of FIG. 1, the operation of the signal processing device according to the present invention will be described in detail.

In step 600, signal separator 200 in the slow mode of the VTR receives a composite video signal scanned by a video head (not shown) of the VTR through an input port IN1 and separates the received signal into a luminance signal (Y) and chrominance signals (R, G and B). That is, LPF 300 separates the luminance signal from the composite video signal, and BPF 302 separates the chrominance signals from the composite video signal. Color-difference separator 304 outputs a first color-difference signal (R-Y) and a second color-difference signal (B-Y), which are obtained by subtracting the luminance signal (Y) from the chrominance signals (R and B).

In step 602, the separated analog color-difference signals, that is, the first color-difference signal (R-Y) and second color-difference signal (B-Y) are output to second A/D converter 308 of A/D converter 202. The analog luminance signal output from LPF 300 is output to first A/D converter 306 and converted to a digital signal. Controller 210 generates a sampling clock using an external clock input through an input port IN3 and outputs the sampling clock to A/D converter 202 and D/A converter 206, respectively.

In step 604, microcomputer 208 detects the envelope of the composite video signal input through input port IN1. When a direct current (DC) component of the envelope exceeds a predetermined level, microcomputer 208 outputs to controller 210 a "high" slow mode signal as shown in FIG. 2A indicating that the state of the composite video signal is acceptable. However, when the DC component falls short of the predetermined value, controller 210 sends a signal to storage unit 204 not to store the video signal therein.

Meanwhile, since the VTR in the slow mode may not read a vertical sync signal recorded on the tape, a dummy vertical sync signal must be generated. The dummy vertical sync signal is generated by microcomputer 208 and is provided to controller 210 to control encoder 212.

In step 606, when the "high" slow mode signal and the "low" dummy vertical sync signal 406, shown in FIG. 2B, are input from microcomputer 208, controller 210 allows storage unit 204 to store the second signal corresponding to each field therein (see reference numeral 402 of FIG. 2C). However, if a slow signal is not input, when the "low" dummy vertical sync signal is input, the signal of the corresponding field is not stored in storage unit 204 (see reference numeral 400 of FIG. 2C) (step 608). The signal of the field which is not stored is not encoded at encoder 212 but is substituted by the signal of the stored field. This is done to eliminate the considerable noise component that occurs when a signal having a low envelope is stored.

As shown in FIG. 1, the digital luminance signal output from first A/D converter 306 is stored in first storage unit 310, and digital first and second color-difference signals output from second A/D converter 308 are stored in second storage unit 312.

Sync signal generator 214 receives a signal having a frequency four times the frequency of a sub-carrier signal from an input port IN2, and frequency-divides the signal to generate a composite sync signal and the sub-carrier signal.

Controller 210 receives the composite sync signal from sync signal generator 214 and controls the storage unit 204 to output the signal stored in storage unit 204 to D/A converter 206. First and second D/A converters 314 and 316 receive the digital luminance and color-difference signals output from first and second storage units 310 and 312, and convert the received signals to analog signals to output the analog-converted signals to encoder 212.

In step 610, encoder 212, being controlled by the composite sync signal and sub-carrier signal, encodes the input analog-converted signals to synthesize the input signals into composite video signal constituting a slow mode image. The composite video signal is then output to an output port OUT.

As described above, in the signal processing device and method for a slow mode function of the VTR according to the present invention, only stable slow mode images are stored in a memory. These stored stable signals are combined with the sync signal to generate a new composite video signal for display during slow mode. Thus, the effect of the present invention is a stable video signal reproduced in the slow mode of a VTR.

What is claimed is:

1. A signal processing device for a slow mode function of a video tape recorder (VTR) comprising:

signal separating means for receiving a composite video signal scanned from a video tape in a slow mode of said VTR, and separating the received signal into a luminance signal and a chrominance signal;

analog-to-digital converting means for converting the separated analog luminance signal and the separated analog chrominance signal to a digital luminance signal and a digital chrominance signal, respectively;

a microcomputer for generating a slow mode signal when a direct current component of an envelope of the scanned composite video signal exceeds a predetermined value; storing means for storing the digital luminance and digital chrominance signals of each field, if the direct current component of the envelope of said composite video signal exceeds the predetermined value, and not storing said digital luminance signal and said digital chrominance signal if the direct current component of the envelope of said composite video signal is less than the predetermined value;

digital-to-analog converting means for converting the stored digital luminance and digital chrominance signals to a converted analog luminance signal and a converted analog chrominance signal, respectively, and outputting the converted analog luminance signal and the converted analog chrominance signal;

a sync signal generator for receiving a sub-carrier signal and outputting a composite sync signal and a sub-carrier signal which is frequency-divided;

encoding means for encoding the converted analog luminance signal and the converted analog chrominance signal in response to the composite sync signal, and outputting an encoded composite video signal as a signal constituting a slow mode image; and controlling means for controlling said storing means in response to said slow mode signal and composite sync signal and controlling said encoding means to encode said converted analog luminance signal and said converted analog chrominance signal if said digital luminance signal and said digital chrominance signal are stored by said storing means, and if said digital luminance signal and said digital chrominance signal are not stored by said storing means, controlling said encoding means to encode a stored digital luminance signal and a stored digital chrominance signal of a previous field.

2. A signal processing device for a slow mode function of a video tape recorder as claimed in claim 1, wherein said signal separating means comprises:

a first filter for separating said analog luminance signal from said composite video signal and outputting the separated analog luminance signal;

a second filter for separating said analog chrominance signal from said composite video signal and outputting the separated analog chrominance signal; and a color-difference separating means for separating the analog chrominance signal output from said second filter into first and second color-difference signals.

3. A signal processing device for a slow mode function of a video tape recorder as claimed in claim 2, wherein said analog-to-digital converting means comprises:

a first analog-to-digital converter for converting the separated analog luminance signal output from said first filter to the digital luminance signal; and a second analog-to-digital converter for converting the first and second color difference signals output from said color-difference separating means to a digital signal.

4. A signal processing device for a slow mode function of a video tape recorder as claimed in claim 1, wherein said storing means comprises:

first storing means for storing said digital luminance signal of each field in response to said slow mode signal and said composite sync signal; and second storing means for storing said digital chrominance signal of each field in response to said slow mode signal and said composite sync signal.

5. A signal processing device for a slow mode function of a video tape recorder as claimed in claim 4, wherein said digital-to-analog converting means comprises:

a first digital-to-analog converter for converting the digital luminance signal stored in said first storing means to said converted analog luminance signal and outputting the converted analog luminance signal; and a second digital-to-analog converter for converting the digital chrominance signal stored in said second storing means to said converted analog chrominance signal and outputting the converted analog chrominance signal.

6. A signal processing method for a slow mode function of a video tape recorder, comprising the steps of:

separating a composite video signal scanned from a video tape in a slow mode of said video tape recorder into a luminance signal and a chrominance signal;

converting said separated luminance and chrominance signals to a digital luminance signal and a digital chrominance signal, respectively;

judging whether a direct current component of an envelope of said composite video signal exceeds a predetermined value;

storing said digital luminance signal and said digital chrominance signal of each field if the direct current component of the envelope of said composite video signal exceeds said predetermined value, and not storing said digital luminance signal and said digital chrominance signal if the direct current component of the envelope of said composite video signal is less than said predetermined value; and synthesizing said video signal by encoding said stored signals if said digital luminance signal and said digital chrominance signal are stored in said storing step, and if said digital luminance signal and said digital chrominance signal are not stored in said storing step, synthesizing said video signal by encoding a stored digital luminance signal and a stored digital chrominance signal of a previous field.

7. A signal processing device for a slow mode function of a video tape recorder (VTR) as set forth in claim 1, wherein said controlling means controls said storing means to store the digital luminance and chrominance signals only when said microcomputer generates said slow mode signal.

* * * * *